(12) United States Patent
Ikeda et al.

(10) Patent No.: US 11,444,308 B2
(45) Date of Patent: Sep. 13, 2022

(54) FUEL CELL STACK

(71) Applicant: HONDA MOTOR CO., LTD., Tokyo (JP)

(72) Inventors: Yuta Ikeda, Wako (JP); Naoki Inoue, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 411 days.

(21) Appl. No.: 16/777,916

(22) Filed: Jan. 31, 2020

(65) Prior Publication Data

US 2020/0251765 A1 Aug. 6, 2020

(30) Foreign Application Priority Data

Feb. 6, 2019 (JP) .............................. JP2019-019627

(51) Int. Cl.
| | |
|---|---|
| *H01M 8/2475* | (2016.01) |
| *H01M 8/242* | (2016.01) |
| *H01M 8/0273* | (2016.01) |
| *H01M 8/248* | (2016.01) |
| *H01M 8/00* | (2016.01) |

(52) U.S. Cl.
CPC ....... *H01M 8/2475* (2013.01); *H01M 8/0273* (2013.01); *H01M 8/242* (2013.01); *H01M 8/248* (2013.01); *H01M 8/006* (2013.01)

(58) Field of Classification Search
None
See application file for complete search history.

(56) References Cited

U.S. PATENT DOCUMENTS

| | | | |
|---|---|---|---|
| 2004/0142228 A1 | 7/2004 | Komura et al. | |
| 2009/0004533 A1* | 1/2009 | Tanaka ................ | H01M 8/2483 |
| | | | 429/481 |
| 2017/0110754 A1* | 4/2017 | Nishiyama .......... | H01M 8/2465 |

FOREIGN PATENT DOCUMENTS

JP      4174025      8/2004

* cited by examiner

*Primary Examiner* — Basia A Ridley
*Assistant Examiner* — Heng M. Chan
(74) *Attorney, Agent, or Firm* — Amin, Turocy & Watson, LLP

(57) ABSTRACT

A fuel cell stack includes a first power output unit connected to a first terminal plate, the first power output unit including a first conductor, and a second conductor extending from the first conductor to the outside of an outer peripheral end of a first inner insulator in the state where the second conductor is placed between the first inner insulator and a first end plate. The second conductor is positioned inside of the first end plate in a stacking direction of a cell stack body.

10 Claims, 8 Drawing Sheets

FUEL CELL STACK

CROSS-REFERENCE TO RELATED APPLICATION

This application is based upon and claims the benefit of priority from Japanese Patent Application No. 2019-019627 filed on Feb. 6, 2019, the contents of which are incorporated herein by reference.

BACKGROUND OF THE INVENTION

Field of the Invention

The present invention relates to a fuel cell stack.

Description of the Related Art

For example, Japanese Patent No. 4174025 discloses a fuel cell stack including a cell stack body formed by stacking a plurality of power generation cells together. Each of the power generation cells includes a membrane electrode assembly and a separator. Terminal plates are provided at ends of the cell stack body in the stacking direction. Insulators (insulating plates) are provided outside the terminal plates, and end plates are provided outside the insulators.

Power output units (terminal units) for collecting electrical energy generated in the power generation cells to the outside are electrically connected to the terminal plates. The power output unit penetrates through the insulator and the end plate in the stacking direction of the cell stack body to the outside of the end plate.

SUMMARY OF THE INVENTION

In this regard, a seal part is provided on the outer periphery of the terminal plate, for preventing leakage of fluid such as reactant gases (a fuel gas and an oxygen-containing gas) and a coolant. In the above described fuel cell stack, since the power output unit extends in the stacking direction of the cell stack body to the outside of the end plate, the power output unit does not extend across the seal part. That is, the desired sealing performance in the outer periphery of the terminal plate is achieved. However, the length of the fuel cell stack in the stacking direction is large disadvantageously.

The present invention has been made taking such a problem into account, and an object of the present invention is to provide a fuel cell stack which makes it possible to achieve the desired sealing performance in the outer periphery of the terminal plate, and reduce the length of the fuel cell stack in the stacking direction.

According to one aspect of the present invention, provided is a fuel cell stack including a cell stack body comprising a plurality of power generation cells stacked together in a stacking direction, the power generation cells each including a membrane electrode assembly and a separator, wherein a terminal plate is provided at one end of the cell stack body in the stacking direction, an insulator is provided outside the terminal plate, and an end plate is provided outside the insulator, a power output unit configured to collect electrical energy generated in the power generation cell to an outside is electrically connected to the terminal plate, the insulator has a surface facing the cell stack body, and a seal part configured to prevent leakage of fluid is provided on the surface, the seal part being provided around the terminal plate, and wherein the power output unit includes a first conductor extending to penetrate through the insulator in the stacking direction, and a second conductor extending from the first conductor to an outside of an outer peripheral end of the insulator in a state where the second conductor is placed on the insulator on an opposite side to the cell stack body, and the second conductor is positioned inside the end plate in the stacking direction of the cell stack body.

In the present invention, the power output unit is connected to the external connector inside the end plate in the stacking direction of the cell stack body. Stated otherwise, the power output unit does not protrude outside of the end plate in the stacking direction. Therefore, it is possible to reduce the length of the fuel cell stack in the stacking direction of the cell stack body. Further, in the state where the second conductor is placed on the insulator on the opposite side to the cell stack body, the second conductor extends to the outside of the outer peripheral end of the insulator. That is, since the second conductor does not extend across the seal part of the insulator, it is possible to achieve the desired sealing performance in the outer periphery of the terminal plate.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, a preferred embodiment of a fuel cell system including a fuel cell stack according to the present invention will be described with reference to the accompanying drawings.

Figure 1:
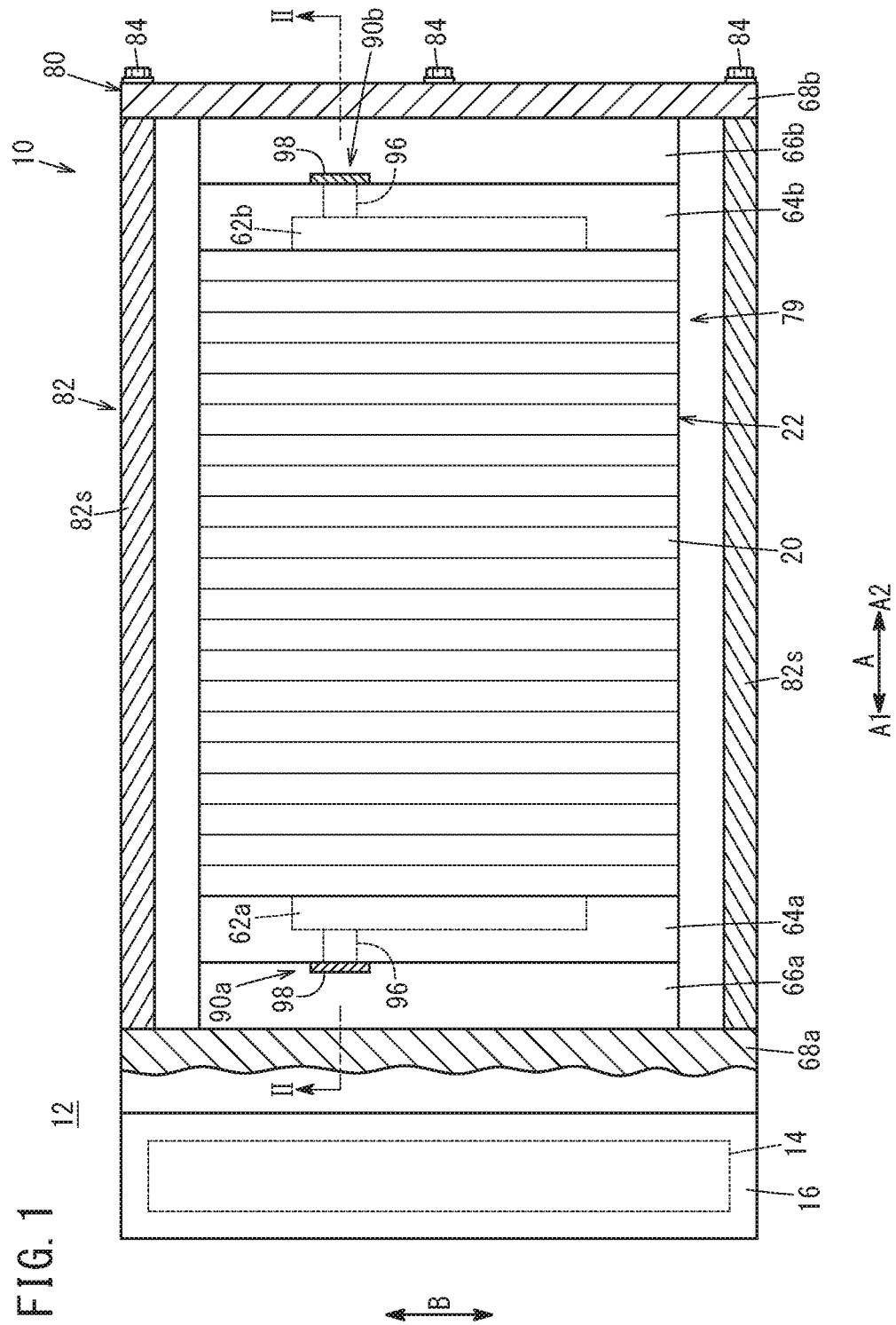
FIG. 1 is a plan view partially in cross section, showing a fuel cell system including a fuel cell stack according to an embodiment of the present invention.

For example, a fuel cell system 12 shown in FIG. 1 is mounted in a fuel cell electrical automobile (not shown). It should be noted that the fuel cell system 12 may be used in stationary applications.

Figure 2:
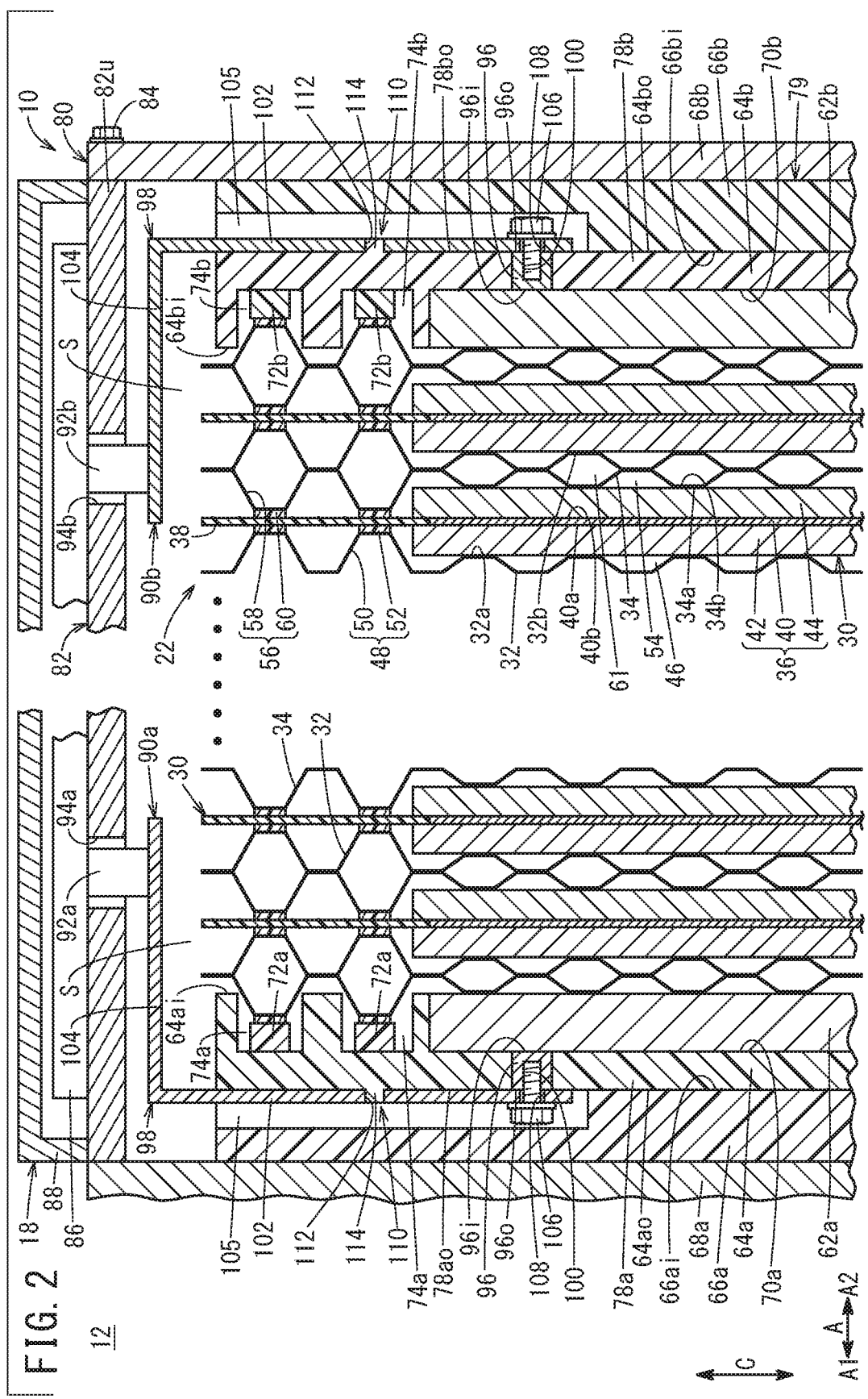
FIG. 2 is a cross sectional view partially omitted, taken along a line II-II in FIG. 1.

As shown in FIGS. 1 and 2, the fuel cell system 12 includes a fuel cell stack 10, a fuel cell auxiliary device 14, an auxiliary device case 16, and a contactor unit 18 (see FIG. 2).

The fuel cell stack 10 includes a cell stack body 22 formed by stacking a plurality of power generation cells 20 in a horizontal direction (indicated by an arrow A). Each of the power generation cells 20 generates power by electrochemical reactions of a fuel gas and an oxygen-containing gas. For example, the power generation cell 20 is a solid polymer electrolyte fuel cell having a laterally elongated (or longitudinally elongated) rectangular shape.

Figure 3:
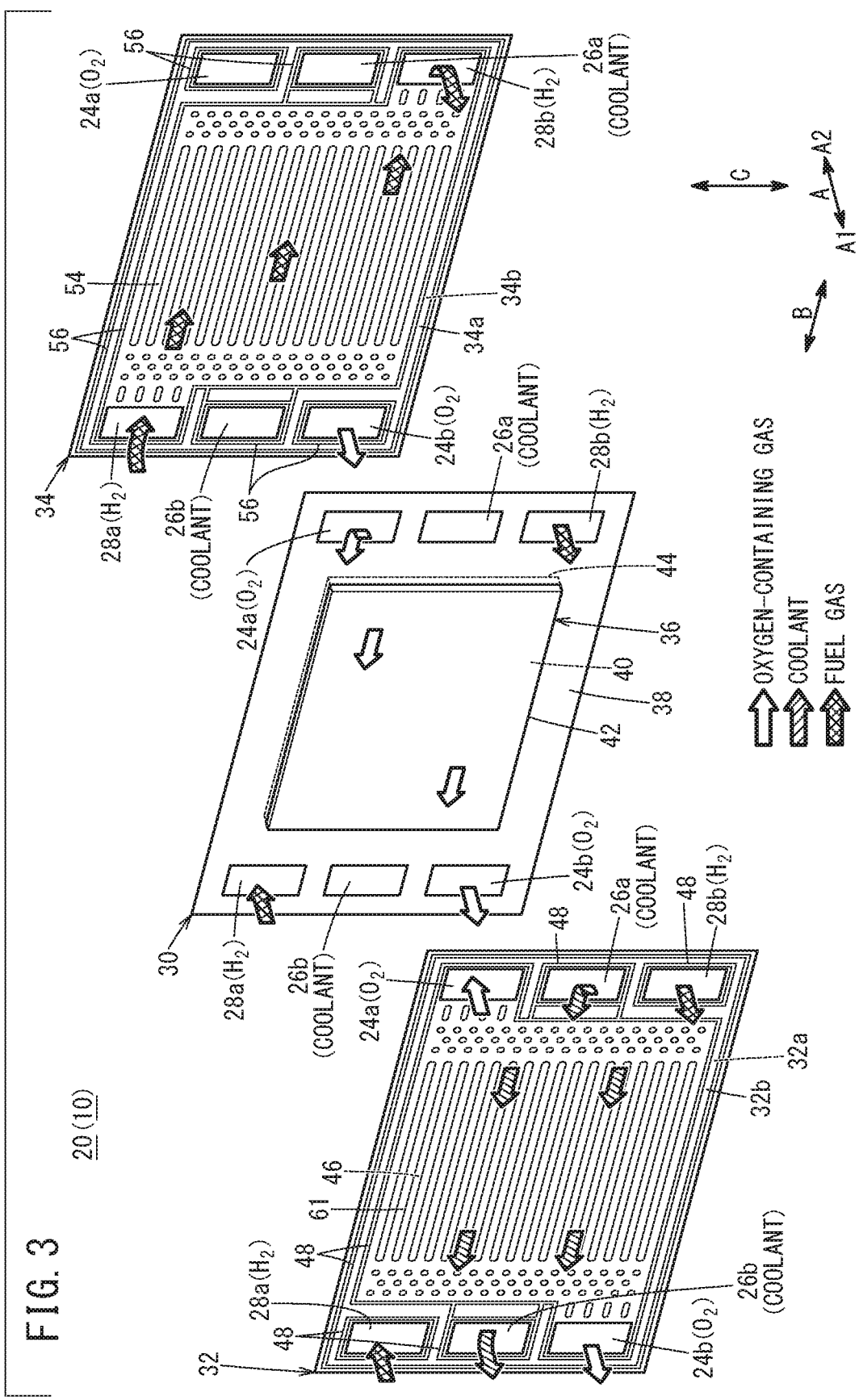
FIG. 3 is an exploded perspective view showing a power generation cell.

As shown in FIG. 3, at one end of the power generation cell 20 in a direction indicated by an arrow B (horizontal direction), an oxygen-containing gas supply passage 24a, a coolant supply passage 26a, and a fuel gas discharge passage 28b are arranged in a direction indicated by an arrow C (vertical direction). An oxygen-containing gas is supplied through the oxygen-containing gas supply passage 24a. A coolant such as pure water, ethylene glycol, or oil is supplied through the coolant supply passage 26a. A fuel gas such as the hydrogen-containing gas is discharged through the fuel gas discharge passage 28b.

The oxygen-containing gas supply passage 24a extends through the power generation cells 20 in the stacking direction indicated by the arrow A. The coolant supply passage 26a extends through the power generation cells 20 in the stacking direction. The fuel gas discharge passage 28b extends through the power generation cells 20 in the stacking direction.

At the other end of the power generation cells 20 in the direction indicated by the arrow B, a fuel gas supply passage 28a, a coolant discharge passage 26b, and an oxygen-containing gas discharge passage 24b are arranged in the direction indicated by the arrow C. The fuel gas is supplied through the fuel gas supply passage 28a. The coolant is discharged through the coolant discharge passage 26b. The oxygen-containing gas is discharged through the oxygen-containing gas discharge passage 24b.

The fuel gas supply passage 28a extends through the power generation cells 20 in the stacking direction. The coolant discharge passage 26b extends through the power generation cells 20 in the stacking direction. The oxygen-containing gas discharge passage 24b extends through the power generation cells 20 in the stacking direction.

As shown in FIGS. 2 and 3, the power generation cell 20 includes a frame equipped membrane electrode assembly (hereinafter referred to as a "frame equipped MEA 30"), and a first separator 32 and a second separator 34 provided on both sides of the frame equipped MEA 30.

The frame equipped MEA 30 includes a membrane electrode assembly (hereinafter referred to as a "MEA 36"), and a frame member 38 provided on an outer peripheral portion of the MEA 36. The MEA 36 includes an electrolyte membrane 40, a cathode 42 provided on one surface 40a of the electrolyte membrane 40, and an anode 44 provided on the other surface 40b of the electrolyte membrane 40.

For example, the electrolyte membrane 40 is a solid polymer electrolyte membrane (cation ion exchange membrane) which is a thin membrane of perfluorosulfonic acid containing water. The electrolyte membrane 40 is interposed between the cathode 42 and the anode 44. A fluorine based electrolyte may be used as the electrolyte membrane 40. Alternatively, an HC (hydrocarbon) based electrolyte may be used as the electrolyte membrane 40.

The frame member 38 has a quadrangular annular shape (quadrangular frame shape). An inner peripheral end of the frame member 38 is held between an outer peripheral end of the cathode 42 and an outer peripheral end of the anode 44. It should be noted that the frame member 38 may be provided integrally with the electrolyte membrane 40.

The cathode 42 includes a first electrode catalyst layer joined to one surface 40a of the electrolyte membrane 40, and a first gas diffusion layer stacked on the first electrode catalyst layer. The anode 44 includes a second electrode catalyst layer joined to the other surface 40b of the electrolyte membrane 40, and a second gas diffusion layer stacked on the second electrode catalyst layer.

Each of the first separator 32 and the second separator 34 has a laterally elongated (or longitudinally elongated) rectangular shape. Each of the first separator 32 and the second separator 34 is made of electrically conductive material. Specifically, each of the first separator 32 and the second separator 34 comprises, e.g., a steel plate, a stainless steel plate, an aluminum plate, a plated steel plate, or a metal plate having an anti-corrosive surface by surface treatment, or a carbon member.

The first separator 32 has an oxygen-containing gas flow field 46 on its surface facing the frame equipped MEA 30 (hereinafter referred to as a "surface 32a"). The oxygen-containing gas flow field 46 is connected to the oxygen-containing gas supply passage 24a and the oxygen-containing gas discharge passage 24b.

A first seal line 48 is provided on the surface 32a of the first separator 32, for preventing leakage of fluid (the oxygen-containing gas, the fuel gas, and the coolant) to the outside.

In FIG. 3, the first seal line 48 is provided around the oxygen-containing gas supply passage 24a, the oxygen-containing gas flow field 46, and the oxygen-containing gas discharge passage 24b, while allowing the oxygen-containing gas flow field 46 to be connected to the oxygen-containing gas supply passage 24a and the oxygen-containing gas discharge passage 24b. Further, the first seal line 48 is provided around the coolant supply passage 26a, the coolant discharge passage 26b, the fuel gas supply passage 28a, and the fuel gas discharge passage 28b, respectively.

In FIG. 2, the first seal line 48 contacts the frame member 38 of the frame equipped MEA 30 in an air-tight manner and a liquid tight manner. The first seal line 48 includes a first bead seal 50 and a first resin member 52. The first bead seal 50 is formed by press forming. The first bead seal 50 is expanded from the surface 32a of the first separator 32 toward the frame equipped MEA 30. The first resin member 52 is fixed to a protruding end surface of the first bead seal 50 by printing or coating.

The first resin member 52 may be fixed to the frame member 38. The first resin member 52 may be dispensed with. In this case, the first bead seal 50 directly contacts the frame member 38 of the frame equipped MEA 30. The first seal line 48 may include, instead of the first bead seal 50, a ridge shaped seal part comprising an elastic member protruding toward the frame member 38 of the frame equipped MEA 30.

As shown in FIGS. 2 and 3, the second separator 34 has a fuel gas flow field 54 on its surface facing the frame equipped MEA 30 (hereinafter referred to as a "surface 34a"). The fuel gas flow field 54 is connected to the fuel gas supply passage 28a and the fuel gas discharge passage 28b.

A second seal line 56 is provided on the surface 34a of the second separator 34, for preventing leakage of fluid (the oxygen-containing gas, the fuel gas, and the coolant) to the outside.

In FIG. 3, the second seal line 56 is provided around the fuel gas supply passage 28a, the fuel gas flow field 54, and the fuel gas discharge passage 28b, while allowing the fuel gas flow field 54 to be connected to the fuel gas supply passage 28a and the fuel gas discharge passage 28b. The second seal line 56 is provided around the coolant supply passage 26a, the coolant discharge passage 26b, the oxygen-containing gas supply passage 24a, and the oxygen-containing gas discharge passage 24b, respectively.

In FIG. 2, the second seal line 56 contacts the frame member 38 of the frame equipped MEA 30 in an air-tight manner and a liquid tight manner. The second seal line 56 includes a second bead seal 58 and a second resin member 60. The second bead seal 58 is formed by press forming. The second bead seal 58 is expanded from the surface 34a of the second separator 34 toward the frame equipped MEA 30. The second resin member 60 is fixed to a protruding end surface of the second bead seal 58 by printing or coating.

The second resin member 60 may be fixed to the frame member 38. The second resin member 60 may be dispensed with. In this case, the second bead seal 58 directly contacts the frame member 38 of the frame equipped MEA 30. The second seal line 56 may include, instead of the second bead seal 58, a ridge shaped seal part comprising an elastic member protruding toward the frame member 38 of the frame equipped MEA 30.

As shown in FIGS. 2 and 3, a coolant flow field 61 is formed between a surface 32b of the first separator 32 and a surface 34b of the second separator 34 that are adjacent to each other. The coolant flow field 61 is connected to the coolant supply passage 26a and the coolant discharge passage 26b, and extends in the direction indicated by the arrow B. The coolant flow field 61 is formed by the back surface of the fuel gas flow field 54 and the back surface of the oxygen-containing gas flow field 46.

As shown in FIGS. 1 and 2, at one end of the cell stack body 22 in the stacking direction (end in a direction indicated by an arrow A1), a first terminal plate 62a is provided. A first inner insulator 64a is provided outside the first terminal plate 62a. A first outer insulator 66a is provided outside the first inner insulator 64a. Further, a first end plate 68a is provided outside the first outer insulator 66a.

The first terminal plate 62a is made of electrically conductive material such as copper, aluminum, stainless steel, titanium, or metal chiefly containing these materials. The first terminal plate 62a has a quadrangular shape (see FIG. 4).

For example, each of the first inner insulator 64a and the first outer insulator 66a is made of polycarbonate (PC) or phenol resin. Each of the first inner insulator 64a and the first outer insulator 66a has a laterally elongated (or longitudinally elongated) rectangular shape (see FIG. 4).

The first inner insulator 64a and the first outer insulator 66a may be made of the same material, may have the same shape, and may have the same size, etc. Alternatively, the first inner insulator 64a and the first outer insulator 66a may be made of different materials, may have different shapes, and may have different sizes, etc.

Figure 4:
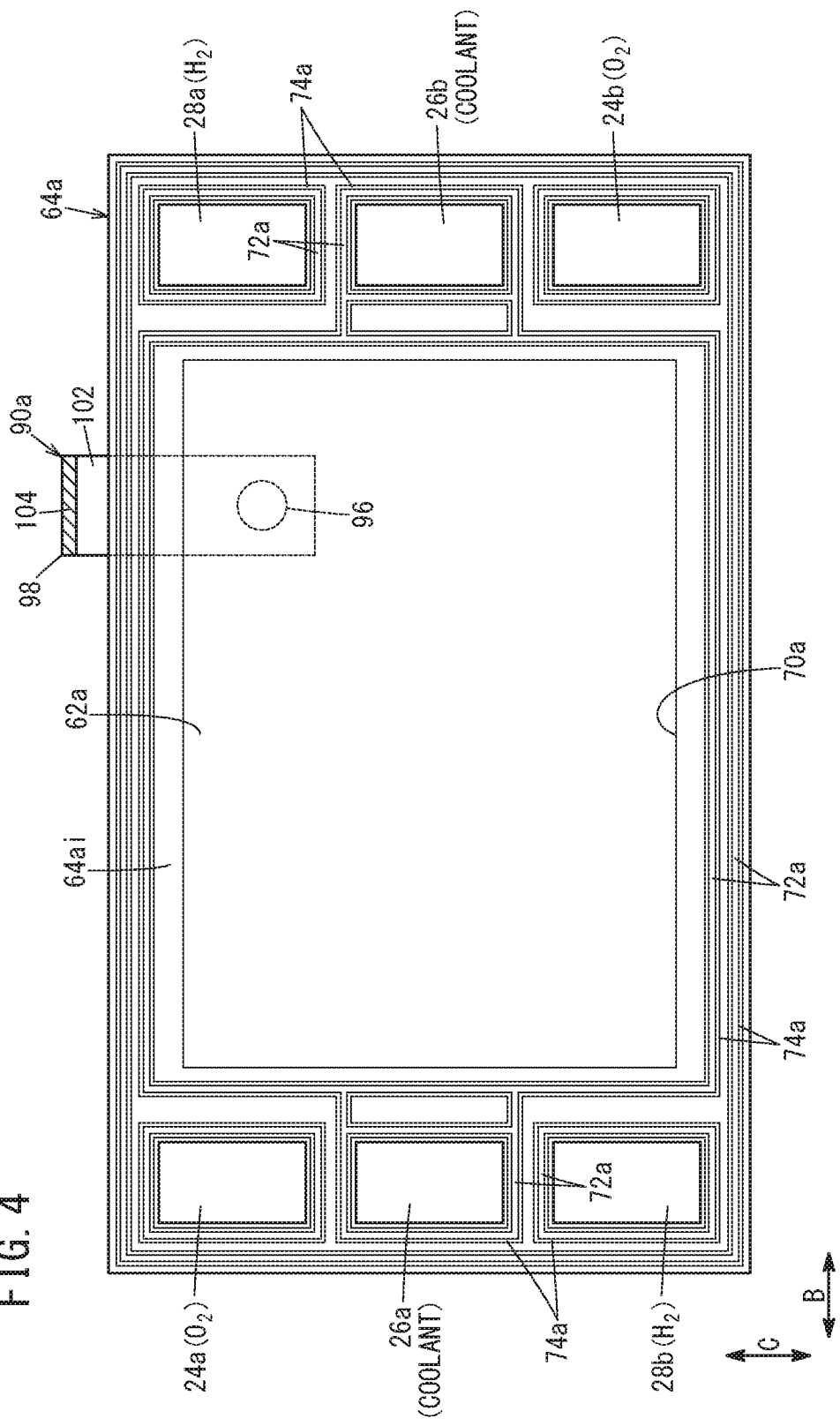
FIG. 4 is a plan view viewed showing a first inner insulator and a first terminal plate viewed from the inside in a stacking direction.

In FIG. 4, at one end of the first inner insulator 64a and the first outer insulator 66a in the direction indicated by the arrow B, the oxygen-containing gas supply passage 24a, the coolant supply passage 26a, and the fuel gas discharge passage 28b are arranged in the direction indicated by the arrow C. At the other end of the first inner insulator 64a and the first outer insulator 66a in the direction indicated by the arrow B, the fuel gas supply passage 28a, the coolant discharge passage 26b, and the oxygen-containing gas discharge passage 24b are arranged in the direction indicated by the arrow C.

As shown in FIGS. 2 and 4, the first inner insulator 64a has, on its surface 64ai oriented inward in the stacking direction, a quadrangular first inner recess 70a in which the first terminal plate 62a is placed.

The first inner insulator 64a has a first seal part 72a on the surface 64ai facing the cell stack body 22. The first seal part 72a is provided around the first terminal plate 62a in order to prevent leakage of fluid (the fuel gas, the oxygen-containing gas, and the coolant). The first seal part 72a contacts the second seal line 56 of the second separator 34 positioned at one end of the cell stack body 22 in the stacking direction (end in the direction indicated by the arrow A1).

In FIG. 4, the first seal part 72a is provided around the first terminal plate 62a. Further, the first seal part 72a is provided around the oxygen-containing gas supply passage 24a, the oxygen-containing gas discharge passage 24b, the coolant supply passage 26a, the coolant discharge passage 26b, the fuel gas supply passage 28a, and the fuel gas discharge passage 28b, respectively.

As shown in FIGS. 2 and 4, the first seal part 72a is placed in a first seal recess 74a formed in the surface 64ai of the first inner insulator 64a. For example, the first seal part 72a has a rectangular shape in lateral cross section, and made of elastic polymer material. Examples of such polymer material include silicone rubber, acrylic rubber, nitrile rubber, etc. The first seal part 72a is joined to the bottom surface of the first seal recess 74a. The position, the size, the shape, etc. of the first seal part 72a may be determined as necessary.

Figure 5:
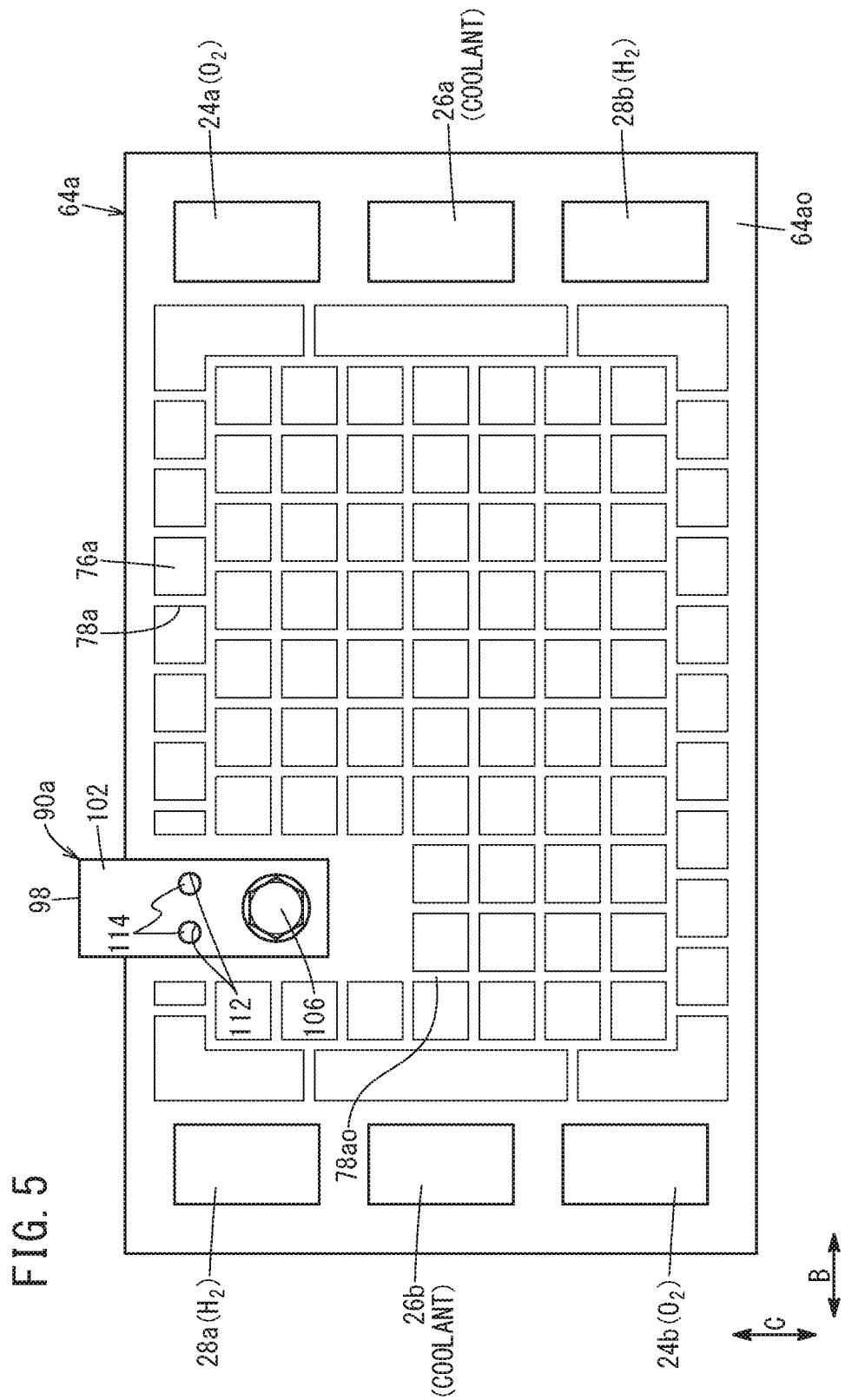
FIG. 5 is a plan view showing the first inner insulator viewed from the outside in the stacking direction.
Figure 6:
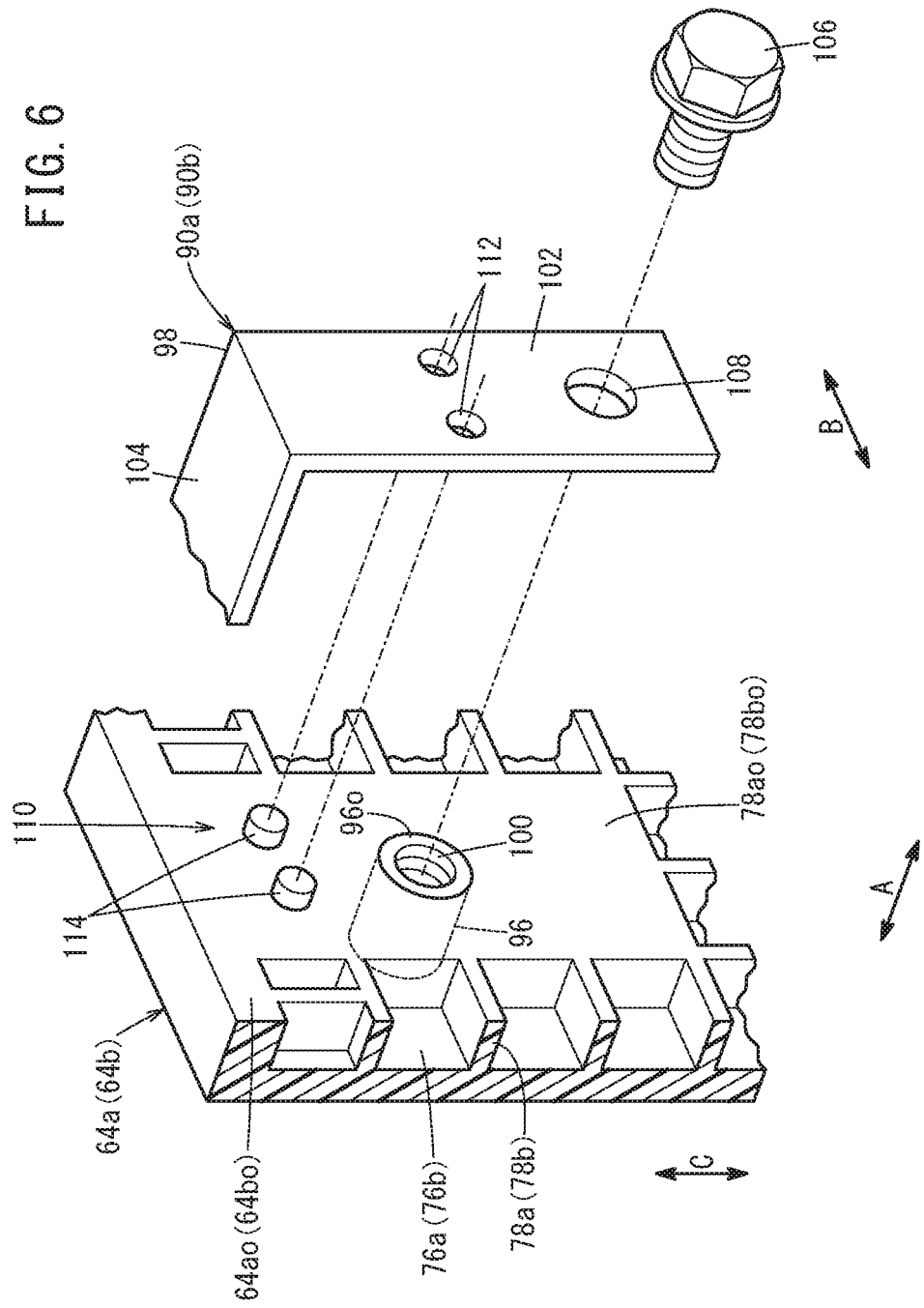
FIG. 6 is an exploded perspective view partially omitted, showing the first inner insulator (second inner insulator) and a first power output unit (second power output unit)

As shown in FIGS. 5 and 6, the first inner insulator 64a has, on its surface 64ao oriented outward in the stacking direction, a rib 78a formed by a plurality of recesses 76a. The air inside the recesses 76a functions as a heat insulating layer. The position, the size, and the shape, etc. of the recess 76a and the rib 78a may be determined as necessary.

In FIG. 2, the first outer insulator 66a has, on its surface 66ai orientated inward in the stacking direction, a rib (not shown) which contacts an end surface 78ao of the rib 78a of the first inner insulator 64a. The air between these ribs functions as a heat insulating layer.

As shown in FIGS. 1 and 2, at the other end of the cell stack body 22 (end in a direction indicated by an arrow A2), a second terminal plate 62b is provided. A second inner insulator 64b is provided outside the second terminal plate 62b. A second outer insulator 66b is provided outside the second inner insulator 64b. Further, a second end plate 68b is provided outside the second outer insulator 66b.

The second terminal plate 62b is made of electrically conductive material such as copper, aluminum, stainless steel, titanium, or metal chiefly containing these materials. The second terminal plate 62b has a quadrangular shape (see FIG. 7).

For example, each of the second inner insulator 64b and the second outer insulator 66b is made of polycarbonate (PC) or phenol resin. Each of the second inner insulator 64b and the second outer insulator 66b has a laterally elongated (or longitudinally elongated) rectangular shape (see FIG. 7).

The second inner insulator 64b and the second outer insulator 66b may be made of the same material, may have the same shape, and may have the same size, etc. Alternatively, the second inner insulator 64b and the second outer insulator 66b may be made of different materials, may have different shapes, and may have different sizes, etc.

Figure 7:
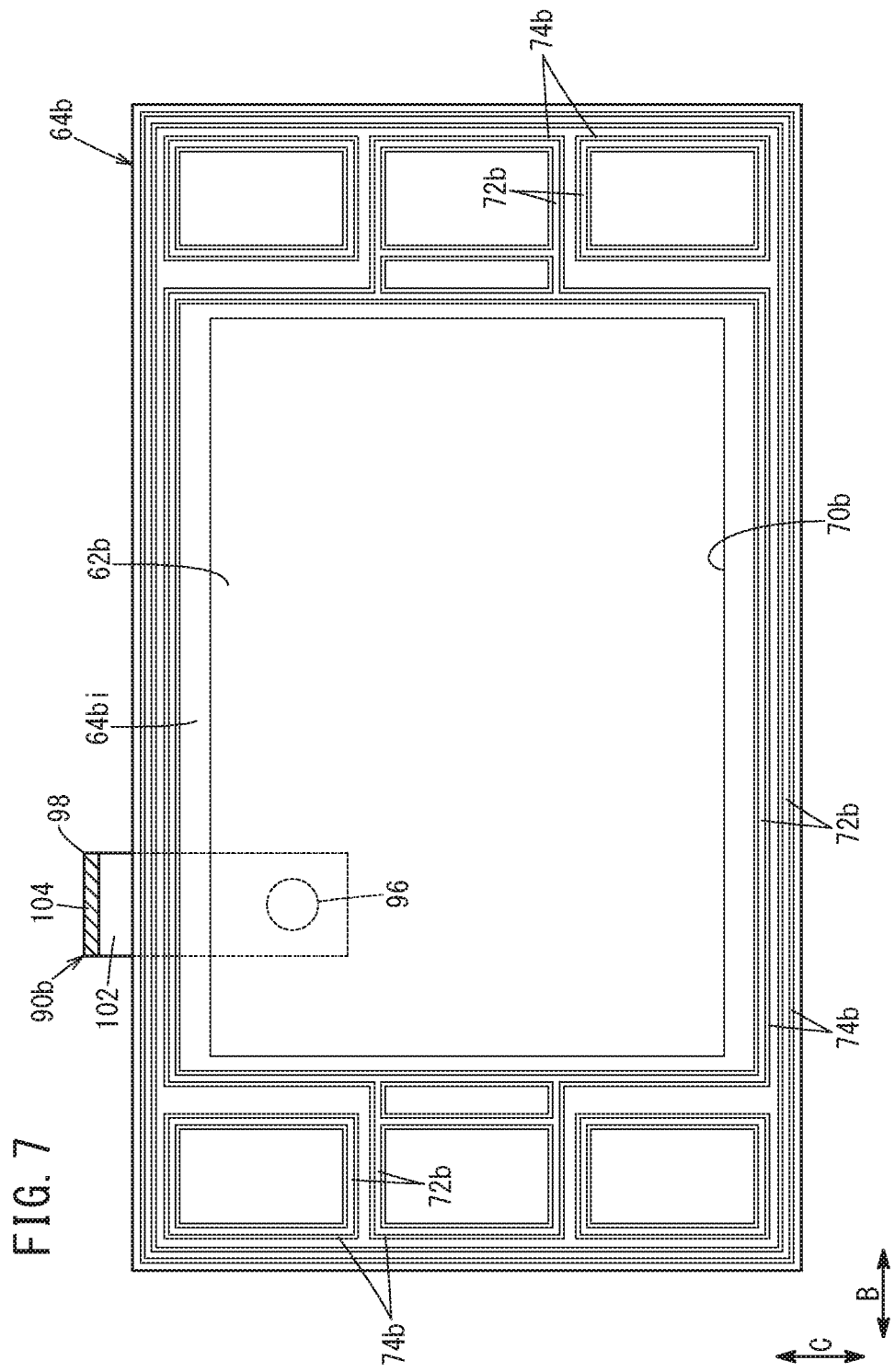
FIG. 7 is a plan view showing a second inner insulator and a second terminal plate viewed from the inside in the stacking direction.

As shown in FIGS. 2 and 7, the second inner insulator 64b has, on its surface 64bi oriented inward in the stacking direction, a quadrangular second inner recess 70b in which the second terminal plate 62b is placed.

The second inner insulator 64b has a second seal part 72b on the surface 64bi facing the cell stack body 22. The second seal part 72b is provided around the second terminal plate 62b in order to prevent leakage of fluid (the fuel gas, the oxygen-containing gas, and the coolant). The second seal part 72b contacts the first seal line 48 of the first separator 32 positioned at the other end of the cell stack body 22 in the stacking direction (end in the direction indicated by the arrow A2). The second seal part 72b is provided around the second terminal plate 62b.

The second seal part 72b is placed in a second seal recess 74b formed in the surface 64bi of the second inner insulator 64b. For example, the second seal part 72b has a rectangular shape in lateral cross section, and made of elastic polymer material. Examples of such polymer material include silicone rubber, acrylic rubber, nitrile rubber, etc. The second seal part 72b is joined to the bottom surface of the second seal recess 74b. The position, the size, the shape, etc. of the second seal part 72b may be determined as necessary.

Figure 8:
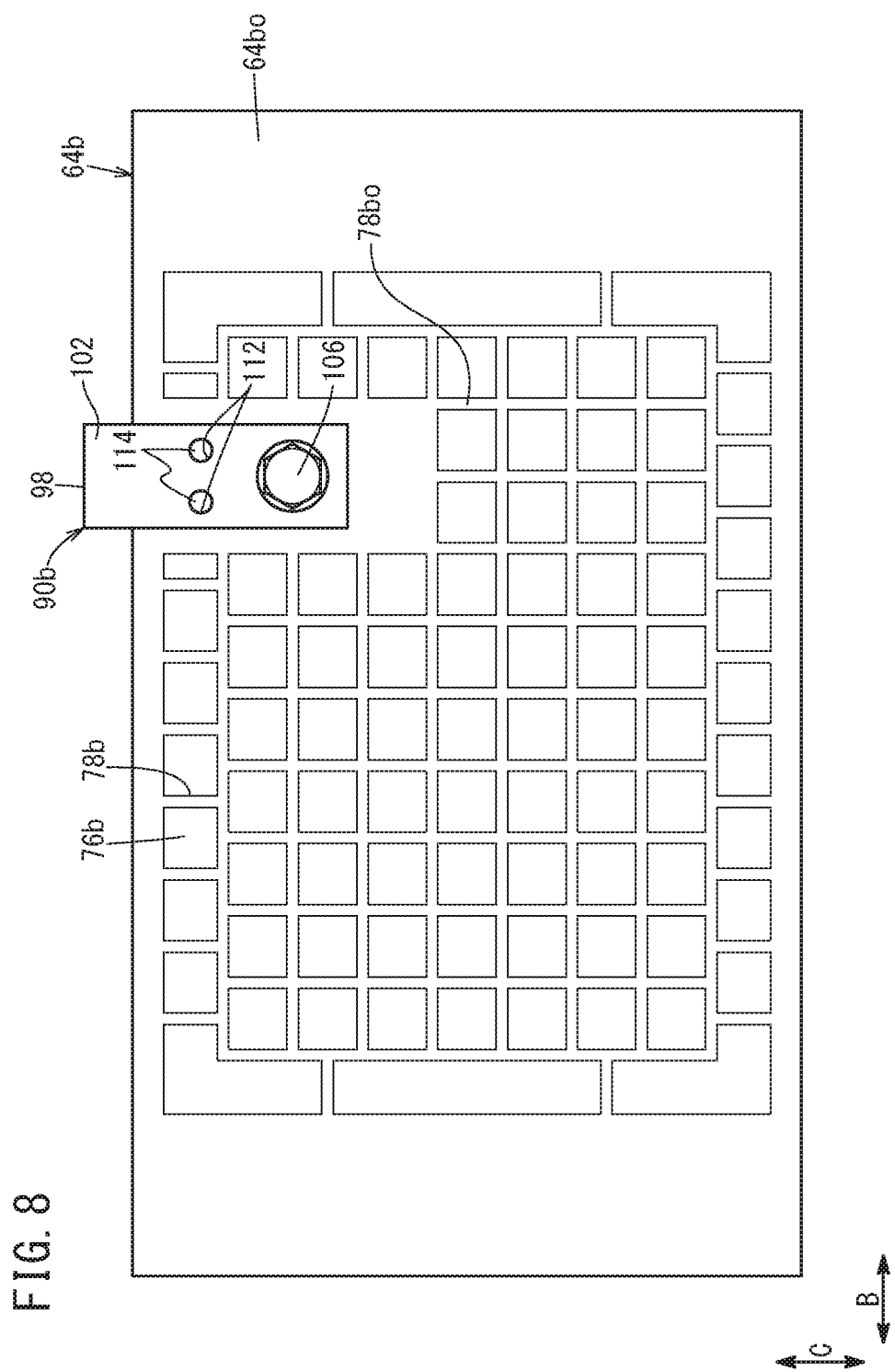
FIG. 8 is a plan view showing the second inner insulator viewed from the outside in the stacking direction.

As shown in FIGS. 6 and 8, the second inner insulator 64b has, on its surface 64bo oriented outward in the stacking direction, a rib 78b formed by a plurality of recesses 76b. The air inside the recesses 76b functions as a heat insulating layer. The position, the size, and the shape, etc. of the recess 76b and the rib 78b may be determined as necessary.

In FIG. 2, the second outer insulator 66b has, on its surface 66bi orientated inward in the stacking direction, a rib (not shown) which contacts an end surface 78bo of the rib 78b of the second inner insulator 64b. The air between these ribs functions as a heat insulating layer.

As shown in FIGS. 1 and 2, the fuel cell stack 10 includes a stack case 80 containing a stack body 79 (the cell stack body 22, the first terminal plate 62a, the first inner insulator 64a, the first outer insulator 66a, the second terminal plate 62b, the second inner insulator 64b, and the second outer insulator 66b).

The stack case 80 includes an outer case 82, the first end plate 68a, and the second end plate 68b. The outer case 82 covers side surfaces of the stack body 79 from directions perpendicular to the stacking direction of the cell stack body 22. The outer case 82 has a quadrangular cylindrical shape. The outer case 82 includes a lower wall (not shown), an upper wall 82u, and left and right side walls 82s. A gap S is formed between the upper wall 82u and the cell stack body 22 (see FIG. 2).

The first end plate 68a is coupled to one end of the outer case 82 using a plurality of tightening members (not shown) such as screw members. The second end plate 68b is coupled to the other end of the outer case 82 using a plurality of tightening members 84 such as screw members. The first end plate 68a and the second end plate 68b apply, to the cell stack body 22, the tightening load toward the inside in the stacking direction.

In FIG. 1, the fuel cell auxiliary device 14 includes fuel gas system auxiliary devices (fuel gas supply devices) such as an injector, an ejector, a hydrogen pump, and valves. The auxiliary device case 16 is a case for protecting the fuel cell auxiliary device 14, and is coupled to the first end plate 68a.

In FIG. 2, the contactor unit 18 is provided on an outer surface (e.g., upper surface) of the upper wall 82u. The contactor unit 18 is a switch box, and includes a contactor 86 (switch), and a contactor case 88 that is placed on an outer surface of the outer case 82 while containing the contactor 86.

The contactor 86 is provided with a first external connector 92a electrically connected to the first terminal plate 62a through a first power output unit 90a, and a second external connector 92b electrically connected to the second terminal plate 62b through a second power output unit 90b.

The upper wall 82u has a first opening 94a into which the first external connector 92a is inserted, and a second opening 94b into which the second external connector 92b is inserted. The first external connector 92a extends from the contactor 86 into the stack case 80 through the first opening 94a. The second external connector 92b extends from the contactor 86 into the stack case 80 through the second opening 94b.

As shown in FIGS. 2 and 6, the first power output unit 90a is a power line for collecting electrical energy generated in the power generation cell 20 to the outside. The first power output unit 90a includes a first conductor 96 and a second conductor 98. The first conductor 96 is a circular column member extending in the stacking direction in a manner to penetrate through the first inner insulator 64a in the stacking direction.

The first conductor 96 is not limited to the circular column member, and may be a quadrangular column member, a cylindrical member, etc. The first conductor 96 is made of electrically conductive material such as copper, aluminum, stainless steel, titanium, or metal chiefly containing these materials. The first conductor 96 may be made of electrically conductive material other than metal.

In FIG. 2, an end surface 96i of the first conductor 96 on the cell stack body 22 side is joined to the first terminal plate 62a. Preferably, the first conductor 96 and the first terminal plate 62a are joined together by means of welding, but may be joined together using bolts, rivets, crimping, adhesive, etc.

In FIG. 4, the first conductor 96 is provided at a position shifted upward and sideward from the center of the first terminal plate 62a. A screw hole 100 is formed in an end surface 96o of the first conductor 96 on the opposite side to the cell stack body 22 (see FIGS. 2 and 6).

The position where the first conductor 96 is joined to the first terminal plate 62a can be determined as necessary. The first conductor 96 and the first terminal plate 62a may be a one-piece molded component.

As shown in FIGS. 2 and 6, the second conductor 98 is a band shaped plate (bus bar). The second conductor 98 is made of electrically conductive material such as copper, aluminum, stainless steel, titanium, or metal chiefly containing these materials. In the state where the second conductor 98 is placed on the first inner insulator 64a on the side opposite to the cell stack body 22 (indicated by the arrow A1), the second conductor 98 extends from the first conductor 96 to the outside of an upper outer peripheral end of the first inner insulator 64a. The second conductor 98 is electrically connected to the first external connector 92a inside the first end plate 68a in the stacking direction of the cell stack body 22, by brazing, crimping, welding, screw engagement, etc.

The second conductor 98 is an-L shaped one-piece molded component, and includes a first extension part 102 and a second extension part 104. The first extension part 102 extends in the direction indicated by the arrow C (vertical direction) along the surface 64ao of the first inner insulator 64a. Specifically, the first extension part 102 is provided between the first inner insulator 64a and the first outer insulator 66a. The first extension part 102 is placed in an outer recess 105 formed in the surface 66ai of the first outer insulator 66a (see FIG. 2). The first extension part 102 contacts, or is positioned closer to, the end surface 78ao of the rib 78a of the first inner insulator 64a.

A hole 108, into which a tightening member 106 as a screw member is inserted, is formed at one end (lower end) of the first extension part 102. The tightening member 106 is screwed with the screw hole 100 to join the first conductor 96 and the second conductor 98 together.

The first extension part 102 is provided with a rotation stopper 110. The rotation stopper 110 prevents rotation of the first extension part 102 about the tightening member 106. The rotation stopper 110 includes two through holes 112 formed at intermediate portions of the first extension part 102 in a direction in which the first extension part 102 extends, and two projections 114 protruding from the first inner insulator 64*a*, and inserted into the two through holes 112, respectively.

The two through holes 112 are arranged in a width direction of the first extension part 102 (in the direction indicated by the arrow B) (see FIG. 6). The projections 114 have a circular column shape. Each of the projections 114 protrudes from the end surface 78*ao* of the rib 78*a* of the first inner insulator 64*a*.

The tightening member 106 is not limited to the screw member, and may be a crimping member, a rivet, etc. The position, the size, the number, and the shape of the through holes 112 and the projections 114 can be determined as necessary. The projections 114 may be joined to the first inner insulator 64*a* as separate components. The projections 114 may be provided in the first outer insulator 66*a*.

The rotation stopper 110 may have any structure as long as the rotation stopper 110 can prevent rotation of the first extension part 102 about the tightening member 106. The rotation stopper 110 may be provided in the second extension part 104. Further, the rotation stopper 110 may be formed by providing a plurality of tightening members 106 for joining the second conductor 98 to the first conductor 96. The first conductor 96 and the second conductor 98 may be a one-piece molded component. The second conductor 98 may be welded to, or adhered to the first conductor 96.

In FIG. 2, the other end (upper end, extended end) of the first extension part 102 is positioned in a gap S between the upper wall 82*u* and the first outer insulator 66*a*. The second extension part 104 extends from the extended end of the first extension part 102 toward the cell stack body 22 (in the direction indicated by the arrow A2). The second extension part 104 and the cell stack body 22 are spaced from each other.

The extended end of the second extension part 104 is positioned between the cell stack body 22 and the upper wall 82*u*. The first external connector 92*a* is connected to the extended end of the second extension part 104. The second conductor 98 may be formed by joining the first extension part 102 and the second extension part 104 together.

As shown in FIGS. 2 and 6, the second power output unit 90*b* has the same structure as the first power output unit 90*a*. Therefore, the structure of the second power output unit 90*b* is omitted.

Next, operation of the fuel cell stack 10 having the above structure will be described.

As shown in FIG. 3, an oxygen-containing gas such as the air is supplied to the oxygen-containing gas supply passage 24*a*. A fuel gas such as a hydrogen-containing gas is supplied to the fuel gas supply passage 28*a*. Coolant such as pure water, ethylene glycol, or oil is supplied to the coolant supply passage 26*a*.

The oxygen-containing gas flows from the oxygen-containing gas supply passage 24*a* into the oxygen-containing gas flow field 46 of the first separator 32. Then, the oxygen-containing gas moves along the oxygen-containing gas flow field 46 in the direction indicated by the arrow B, and the oxygen-containing gas is supplied to the cathode 42 of the MEA 36.

In the meanwhile, the fuel gas flows from the fuel gas supply passage 28*a* into the fuel gas flow field 54 of the second separator 34. Then, the fuel gas moves along the fuel gas flow field 54 in the direction indicated by the arrow B, and the fuel gas is supplied to the anode 44 of the MEA 36.

Then, in each of the MEA 36, the oxygen-containing gas supplied to the cathode 42 and the fuel gas supplied to the anode 44 are consumed in the electrochemical reactions in the first electrode catalyst layer and the second electrode catalyst layer to perform power generation.

Then, the oxygen-containing gas supplied to the cathode 42 is partially consumed at the cathode 42, and the oxygen-containing gas flows from the oxygen-containing gas flow field 46 to the oxygen-containing gas discharge passage 24*b*. Then, the oxygen-containing gas is discharged along the oxygen-containing gas discharge passage 24*b* in the direction indicated by the arrow A. Likewise, the fuel gas supplied to the anode 44 is partially consumed at the anode 44, and the fuel gas flows from the fuel gas flow field 54 to the fuel gas discharge passage 28*b*. Then, the fuel gas is discharged along the fuel gas discharge passage 28*b* in the direction indicated by the arrow A.

Further, after the coolant supplied to the coolant supply passage 26*a* flows into the coolant flow field 61 formed between the first separator 32 and the second separator 34 that are joined together, the coolant flows in the direction indicated by the arrow B. After the coolant cools the MEA 36, the coolant is discharged from the coolant discharge passage 26*b*.

In this case, the fuel cell stack 10 according to the embodiment of the present invention offers the following advantages.

The power output unit (the first power output unit 90*a* and the second power output unit 90*b*) includes the first conductor 96 extending to penetrate through the insulator (the first inner insulator 64*a* and the second inner insulator 64*b*) in the stacking direction, and the second conductor 98 extending from the first conductor 96 to the outside of the outer peripheral end of the insulator (the first inner insulator 64*a* and the second inner insulator 64*b*) in the state where the second conductor 98 is placed on the insulator (the first inner insulator 64*a* and the second inner insulator 64*b*) on the opposite side to the cell stack body 22. The second conductor 98 is positioned inside the end plate (the first end plate 68*a* and the second end plate 68*b*) in the stacking direction of the cell stack body 22.

In the structure, the power output unit (the first power output unit 90*a* and the second power output unit 90*b*) is connected to the external connector (the first external connector 92*a* and the second external connector 92*b*) inside of the end plate (the first end plate 68*a* and the second end plate 68*b*) in the stacking direction of the cell stack body 22. Stated otherwise, the power output unit (the first power output unit 90*a* and the second power output unit 90*b*) does not protrude outside of the end plate (the first end plate 68*a* and the second end plate 68*b*) in the stacking direction.

Therefore, it is possible to reduce the length of the fuel cell stack 10 in the stacking direction of the cell stack body 22. Further, in the state where the second conductor 98 is placed on the insulator (the first inner insulator 64*a* and the second inner insulator 64*b*) on the opposite side to the cell stack body 22, the second conductor 98 extends to the outside of the outer peripheral end of the insulator (the first inner insulator 64*a* and the second inner insulator 64*b*). That is, since the second conductor 98 does not extend across the seal part (the first seal part 72*a* and the second seal part 72*b*) of the insulator (the first inner insulator 64*a* and the second inner insulator 64*b*), it is possible to suitably achieve the sealing performance in the outer periphery of the terminal plate (the first terminal plate 62*a* and the second terminal plate 62*b*).

The second conductor 98 includes the first extension part 102 extending from the first conductor 96 along the insulator (the first inner insulator 64*a* and the second inner insulator 64*b*) to the outside of the outer peripheral end of the insulator (the first inner insulator 64*a* and the second inner insulator 64*b*), and the second extension part 104 extending from the extended end of the first extension part 102 toward the cell stack body 22.

In the structure, it is possible to connect the second conductor 98 to the external connector (the first external connector 92*a* and the second external connector 92*b*) on the side closer to the cell stack body 22 than from the first extension part 102.

The fuel cell stack 10 includes the outer case 82 which covers the cell stack body 22, the terminal plate (the first terminal plate 62*a* and the second terminal plate 62*b*), and the insulator (the first inner insulator 64*a* and the second inner insulator 64*b*) from the direction perpendicular to the stacking direction. The opening (the first opening 94*a* and the second opening 94*b*), into which the external connector (the first external connector 92*a* and the second external connector 92*b*) is inserted, is formed in the outer case 82. The external connector (the first external connector 92*a* and the second external connector 92*b*) is connected to the extended end of the second conductor 98.

In the structure, it is possible to easily connect the second conductor 98 to the external connector (the first external connector 92*a* and the second external connector 92*b*) with a simple structure.

The fuel cell stack 10 includes the tightening member 106 which joins the first conductor 96 and the second conductor 98 together, and the rotation stopper 110 which prevents rotation of the second conductor 98 about the tightening member 106.

In the structure, it is possible to easily assemble the fuel cell stack 10.

The rotation stopper 110 includes the plurality of projections 114 protruding from the insulator (the first inner insulator 64*a* and the second inner insulator 64*b*) and engaged with the second conductor 98.

In the structure, it is possible to prevent rotation of the second conductor 98 about the tightening member 106 with a simple structure.

The fuel cell stack 10 includes the outer insulator (the first outer insulator 66*a* and the second outer insulator 66*b*) provided between the insulator (the first inner insulator 64*a* and the second inner insulator 64*b*) and the end plate (the first end plate 68*a* and the second end plate 68*b*), outside the cell stack body 22 in the stacking direction. The end plate (the first end plate 68*a* and the second end plate 68*b*) applies, to the outer insulator (the first outer insulator 66*a* and the second outer insulator 66*b*), the tightening load toward the inside in the stacking direction of the cell stack body 22. The outer recess 105, in which the second conductor 98 is placed, is formed in the surface 66*ai*, 66*bi* of the outer insulator (the first outer insulator 66*a* and the second outer insulator 66*b*), the surface facing the insulator (the first inner insulator 64*a*, the second inner insulator 64*b*).

In the structure, it is possible to apply, to the cell stack body 22, the tightening load toward the inside in the stacking direction, and provide the second conductor 98 extending to the outside of the outer peripheral end of the insulator (the first inner insulator 64*a* and the second inner insulator 64*b*).

The rib 78*a*, 78*b* is formed on the surface 64*ao*, 64*bo* of the insulator (the first inner insulator 64*a* and the second inner insulator 64*b*), the surface being oriented opposite to the cell stack body 22.

In the structure, it is possible to increase the rigidity of the insulator (the first inner insulator 64*a* and the second inner insulator 64*b*) by the rib 78*a*, 78*b*.

The present invention is not limited to have the above structure. The first extension part 102 of the second conductor 98 may extend sideward or the downward from the first conductor 96 to the outside of the outer peripheral end of the insulator (the first inner insulator 64*a* and the second inner insulator 64*b*).

The fuel cell stack according to the present invention is not limited to the above described embodiment. It is a matter of course that various structures can be adopted without departing from the gist of the present invention.

What is claimed is:

1. A fuel cell stack comprising a cell stack body comprising a plurality of power generation cells stacked together in a stacking direction, the power generation cells each including a membrane electrode assembly and a separator,
   wherein a terminal plate is provided at one end of the cell stack body in the stacking direction, an insulator is provided outside the terminal plate, and an end plate is provided outside the insulator,
   a power output unit configured to collect electrical energy generated in the power generation cell to an outside is electrically connected to the terminal plate,
   the insulator has a surface facing the cell stack body, and a seal part configured to prevent leakage of fluid is provided on the surface, the seal part being provided around the terminal plate, and
   wherein the power output unit comprises:
   a first conductor extending to penetrate through the insulator in the stacking direction; and
   a second conductor extending from the first conductor to an outside of an outer peripheral end of the insulator in a state where the second conductor is placed on the insulator on an opposite side to the cell stack body, and
   the second conductor is positioned inside the end plate in the stacking direction of the cell stack body.

2. The fuel cell stack according to claim 1, wherein the second conductor comprises:
   a first extension part extending from the first conductor along the insulator to the outside of the outer peripheral end of the insulator; and
   a second extension part extending from an extended end of the first extension part toward the cell stack body.

3. The fuel cell stack according to claim 2, wherein the fuel cell stack comprises an outer case configured to cover the cell stack body, the terminal plate, and the insulator from a direction perpendicular to the stacking direction,
   an opening, into which an external connector is inserted, is formed in the outer case, and
   the external connector is connected to an extended end of the second conductor.

4. The fuel cell stack according to claim 1, wherein the fuel cell stack comprises:
   a tightening member configured to join the first conductor and the second conductor together; and
   a rotation stopper configured to prevent rotation of the second conductor about the tightening member.

5. The fuel cell according to claim 4, wherein the rotation stopper comprises a plurality of projections protruding from the insulator and engaged with the second conductor.

6. The fuel cell stack according to claim 1, wherein
the fuel cell stack comprises an outer insulator provided between the insulator and the end plate, outside the cell stack body in the stacking direction,
the end plate is configured to apply, to the outer insulator, a tightening load toward an inside in the stacking direction of the cell stack body, and
an outer recess, in which the second conductor is placed, is formed in a surface of the outer insulator, the surface facing the insulator.

7. The fuel cell stack according to claim 1, wherein a rib is formed on a surface of the insulator, the surface being oriented opposite to the cell stack body.

8. The fuel cell stack according to claim 1, wherein an inner recess, in which the terminal plate is placed, is formed on a surface of the insulator, the surface being oriented toward the cell stack body.

9. The fuel cell stack according to claim 7, wherein
the rib is provided on the surface of the insulator oriented opposite to the cell stack body, by forming a recess, and
air inside the recess functions as a heat insulating layer.

10. The fuel cell stack according to claim 5, wherein the second conductor has a through hole into which each of the projections is inserted.

* * * * *